Patented June 18, 1929.

1,717,761

UNITED STATES PATENT OFFICE.

GEORGES CLAUDE, OF PARIS, FRANCE, ASSIGNOR TO SOCIETE L'AIR LIQUIDE, SOCIETE ANONYME POUR L'ETUDE ET L'EXPLOITATION DES PROCEDES GEORGES CLAUDE, OF PARIS, FRANCE, A CORPORATION OF FRANCE.

PURIFICATION OF COKE-OVEN GASES AND THE LIKE.

No Drawing. Application filed November 4, 1926, Serial No. 146,280, and in France November 17, 1923.

The preliminary purification of coke oven gases and the like, the constituents of which are to be separated by means of liquefaction is, as is well known, of considerable importance. The present invention relates to the purification of such gases which are to be ultimately subjected to such liquefaction treatment, and has particular reference to improvements in carrying out the latter stages of the purification treatment so as to remove from the gases substances which were ordinarily retained therein with the processes as heretofore carried out and also to effect a thorough drying of the gases and the removal therefrom of any residual amounts of reagents employed in the course of the treatment of the gases.

After the separation of the tar, the crude coke oven gases are subjected to treatment for the removal, firstly of liquid and solid particles, secondly of hydrocarbons such as benzene, toluene, etc., and thirdly of carbon dioxid and sulphuretted hydrogen by any known methods as desired, among which the following may be mentioned:—

The gases which leave the tar-removing apparatus are subjected to centrifugal force so as to eliminate mechanically the liquid and solid particles present therein. They are next compressed and the hydrocarbons removed by passing the gases through a tower, preferably filled with Raschig rings, through which a current of heavy oils is maintained in circulation by means of a pump; the heavy oils, after leaving the tower, are treated so as to recover the benzene therefrom.

The last traces of the hydrocarbons, such as benzene, toluene, etc., are removed from the gases by treatment with cresol or any other specially efficacious solvent in a second Raschig ring tower. This cresol, after having been heated so as to eliminate the very small quantities of the hydrocarbons that it has absorbed, is afterwards returned into the circuit. The quantities of such hydrocarbons absorbed by the cresol or other solvent will not in general be worth while recovering, but it is important to remove them from the gases as their presence might be very inconvenient since it might result in obstructing the liquefying apparatus.

The carbon dioxid and any sulphuretted hydrogen are then removed by passing the gases through a column provided with Raschig rings through which an ammoniacal solution is circulated. This solution can afterwards be regenerated by subjecting it to treatment according to the process described in French patent specification No. 570,121 so as to remove carbon dioxid and any sulphuretted hydrogen therefrom, and thus render the absorbing ammoniacal solution available for re-use in the process, or it may be distilled and the ammonia evolved led to a suitable apparatus where the ammonia is converted into sulphate or other products.

The ammonia which remains in the gases is removed in a tower (or in an extension of the preceding one wherein the carbon dioxid is removed) through which a current of water is circulated. In the second case, referred to in the preceding paragraph, namely where the ammoniacal solution is distilled after use, this water can be utilized in the manufacture of the ammoniacal solution.

As the absorption of carbon dioxid has to be as complete as possible, the treatment of the gases with ammonia for this purpose is completed by treatment with a caustic alkali solution, such as sodium or potassium hydroxid, in another column.

According to the present invention, the removal of carbon dioxid from the gases is rendered complete by treating them with a solution of caustic soda, potash or other caustic alkali or alkalies, inorganic or organic, alone or admixed, containing a certain proportion of di-, tri-, or other polyhydric alcohols, such, for example, as glycerine (ordinary glycol), ethylene glycol, trimethylene glycol, etc., alone or in mixture with each other, whereby at the same time the absorption of carbon oxysulphid or other organic sulphur compounds that may be present is also effected by the said solution. The gases, after subjection to this treatment, may still contain in addition to moisture traces of ammonia and soda or other alkali, of which they must be deprived with the greatest care; for this purpose they may be subjected in a final column of the apparatus to the action of a current of sulphuric acid, which thus furnishes the triple result of drying the gases and at the same time removing the traces of soda, etc., and ammonia.

This method of drying the gases is especially applicable when the ammonia is to be converted into sulphate. There are then available very large quantities of sulphuric acid which pass into the dehydrating column and which only become slightly hydrated therein, so that this concentrated acid does not attack the metal walls of the apparatus, when they are made of such material. Furthermore if, in accordance with a further feature of this invention, there be added to the sulphuric acid very small quantities of an appropriate catalyst, such as tungstic oxid, vanadic oxid, etc., this catalyst, under the influence of pressure, will permit the rapid absorption in the acid of a large part of the ethylene present, which may be converted into alcohol. The sulphuric acid carried along by the gases may be retained by passing them through a supplementary receptacle, containing solid soda if need be.

The present application is in part a substitute for, and in part a continuation of, my prior application, Serial No. 744,822, filed October 20, 1924.

I claim as my invention:—

1. A process for the preliminary purification of gases intended to be subjected to partial liquefaction for the separation of their various constituents, wherein after the gases have been freed from tar, liquid and solid particles and hydrocarbons, and the greater part of the carbon dioxid has been removed, the removal of carbon dioxid and inorganic sulphur compounds from the gases is rendered complete by treating them with a solution of caustic soda containing a certain proportion of glycerine.

2. A process as claimed in claim 1, in which the gases, after treatment with the caustic soda solution containing glycerine, are treated with sulphuric acid so as to remove moisture and traces of soda and ammonia.

3. In a process for the removal of organic sulphur compounds from a gaseous mixture containing them, the step of treating the gases with a solution of caustic soda containing glycerine.

4. In a process for the removal of organic sulphur compounds from a gaseous mixture containing them, the steps of treating the gases first with a solution of caustic soda containing glycerine, and thereafter with sulphuric acid to which a catalyst has been added.

5. In a process for the removal of organic sulphur compounds from a gaseous mixture containing them, the step of treating the gases with a caustic alkali solution containing a polyhydric alcohol.

6. In a process for the removal of organic sulphur compounds from a gaseous mixture containing them, the steps of treating the gases first with a caustic alkali solution containing a polyhydric alcohol, and thereafter with sulphuric acid to which a catalyst has been added.

7. A process for the preliminary purification of gases intended to be subjected to partial liquefaction for the separation of their various constituents, wherein after the gases have been freed from tar, liquid and solid particles and hydrocarbons, and the greater part of the carbon dioxid has been removed, the remaining carbon dioxid and the organic sulphur compounds are removed from the gases by treating them with a caustic alkali solution containing a polyhydric alcohol.

8. A process according to claim 7, in which the gases, after treatment with the caustic alkali solution containing a polyhydric alcohol, are treated with sulphuric acid.

9. The process of purifying a hydrogen-containing gaseous mixture contaminated with organic sulphur compounds, which comprises contacting said gaseous mixture with a solution of caustic alkali and glycerin.

10. The process of purifying a hydrogen-containing gaseous mixture contaminated with organic sulphur compounds, which comprises contacting said gaseous mixture with a solution of caustic alkali and a polyhydric alcohol.

In testimony whereof I affix my signature.

GEORGES CLAUDE.